US009665092B2

(12) United States Patent
Hwang et al.

(10) Patent No.: US 9,665,092 B2
(45) Date of Patent: May 30, 2017

(54) METHOD AND APPARATUS FOR MANAGING FAILURE MODES FOR CONDITION BASED MAINTENANCE IN MARINE RESOURCE PRODUCTION EQUIPMENT

(71) Applicant: PARTDB INC., Daejeon (KR)

(72) Inventors: Jin Sang Hwang, Daejeon (KR); Duck-Yong Song, Daejeon (KR); Hwan-Seok Gim, Daejeon (KR)

(73) Assignee: PARTDB INC., Daejeon (KR)

( * ) Notice: Subject to any disclaimer, the term of this patent is extended or adjusted under 35 U.S.C. 154(b) by 11 days.

(21) Appl. No.: 14/993,750

(22) Filed: Jan. 12, 2016

(65) Prior Publication Data
US 2016/0239743 A1 Aug. 18, 2016

(30) Foreign Application Priority Data
Feb. 15, 2015 (KR) .................. 10-2015-0022959

(51) Int. Cl.
*G05B 19/418* (2006.01)
*G06N 99/00* (2010.01)

(52) U.S. Cl.
CPC ........... *G05B 19/41885* (2013.01); *G05B 2219/42061* (2013.01); *G06N 99/005* (2013.01); *Y02P 90/02* (2015.11)

(58) Field of Classification Search
None
See application file for complete search history.

(56) References Cited

U.S. PATENT DOCUMENTS

| 2013/0226348 A1* | 8/2013 | Zheng | G05D 21/02 700/272 |
| 2014/0067352 A1* | 3/2014 | Ashok | E21B 41/00 703/6 |
| 2016/0055280 A1* | 2/2016 | Devoy | G06F 17/5018 703/2 |

FOREIGN PATENT DOCUMENTS

| JP | 2000056080 A | 2/2000 |
| KR | 10-2011-0129276 A | 12/2011 |

(Continued)

*Primary Examiner* — Kakali Chaki
*Assistant Examiner* — Daniel Pellett
(74) *Attorney, Agent, or Firm* — Novick, Kim & Lee, PLLC; Jae Youn Kim (57) ABSTRACT

Provided is a method and apparatus for managing failure modes for condition based maintenance in marine resource production equipment. The apparatus includes a distributed control system (DCS), monitoring, and performance evaluation module that constructs a distributed control system for the systematic collection and management of maintenance data, develops a real-time data management and monitoring system, and develops an offshore plant performance monitoring level performance evaluation system, a condition based maintenance platform that maps data from a real-time sensor database of the distributed control system (DCS), monitoring, and performance evaluation module, stores the mapped data, and manages learnable failure modes based on normal mode and failure mode data, a diagnosis, prediction, maintenance, and shape management module that develops technology for automatically improving the reliability of condition based maintenance based on the learnable failure mode management according to data transmitted from the distributed control system (DCS), monitoring, and performance evaluation module to the condition based maintenance platform, develops an offshore plant diagnosis, prediction, and maintenance system, and develops a diagnosis (Continued)

and condition based maintenance operating platform and a shape management system, and a virtual offshore plant simulator that constructs a virtual offshore plant simulator, constructs a scenario based operation training system, and develops a condition based maintenance solution and an input and output virtualization system for interoperation with a supervisory control and data acquisition (SCADA) system for an offshore plant.

13 Claims, 10 Drawing Sheets

(56) References Cited

FOREIGN PATENT DOCUMENTS

| KR | 10-2012-0085223 A | 7/2012 |
|---|---|---|
| KR | 10-2013-0024841 A | 3/2013 |
| KR | 10-2013-0065800 A | 6/2013 |
| KR | 10-2013-0114515 A | 10/2013 |
| KR | 10-2014-0025803 A | 3/2014 |
| KR | 101456781 B1 | 11/2014 |

\* cited by examiner

METHOD AND APPARATUS FOR MANAGING FAILURE MODES FOR CONDITION BASED MAINTENANCE IN MARINE RESOURCE PRODUCTION EQUIPMENT

BACKGROUND OF THE INVENTION

Field of the Invention

The present invention is based on the National Research and Development Project (10045212) and the Industrial Convergent Technology and Industrial Core Technology Development Project (IT Convergence) supported by the Ministry of Trade, Industry and Energy of Korea and the Korea Evaluation Institute of Industrial Technology.

The present invention relates to condition based maintenance in marine resource production equipment, and more particularly to a method and apparatus for managing failure modes for condition based maintenance in marine resource production equipment.

Description of the Related Art

With the recent acceleration in the consumption of resources due to industrial development, it is difficult to supply enough resources to satisfy the demand for resources through the development of onshore resources alone. For this reason, it is becoming more and more important to drill and produce resources, such as oil and gas, in the sea, particularly the deep sea.

In Korea, vessel type offshore plants are generally used. In the Gulf of Mexico, the North Sea, and the like, however, jack-up rig type, TLP type, and SPAR type offshore plants are also commonly used.

The task of determining whether to extend the life span of offshore plants that were installed after the year 1980 and have been operated for 25 years or more or whether to dismantle the offshore plants based on calculation of the remaining life span of the offshore plants has become more common since the year 2005. In DNVGL and ABS, the life span extension market is expected to expand, and related engineering services and software have been strengthened.

In fields related to systems for condition based maintenance in offshore plants, products from DNV, GE, SAS, and SIEMENS provide high CBM level functions, and Aker Solutions has released an engineering service based asset management system on the market.

The life spans of offshore plants that have been operated since the year 1980 are expiring all over the world. Oil companies have to choose whether to extend the life spans of their platforms or whether to order new platforms. Therefore, it is necessary to develop a total system that is capable of enabling the oil majors to determine whether to extend the life span of their platforms or to order new platforms. In addition, it is necessary to develop a condition based maintenance system through research on offshore plant industry characteristics in order to find offshore plant maintenance markets, which have expanded.

An offshore plant (e.g. an oil platform or an offshore platform) is a large-scale structure, which drills for oil, and extracts and stores oil and natural gas. The offshore plant may be configured to have a fixed type structure or a floating type structure based on the environments in which the offshore plant is used. In addition, the offshore plant may be configured to have a subsea structure, in which one or more oil wells are connected to the platform via oil or gas supply lines.

Drilling vessels, which are vessel type offshore plants, are used in the deep sea or in choppy waters, where it is not possible to install platforms. As of the year 2013, 79 such vessels are in operation, and 68 more vessels are under construction worldwide.

Floating production storage and offloading (FPSO) vessels are vessel type offshore plants configured to refine and store crude oil collected from platforms around the FPSO vessels and subsea lines. Such FPSO vessels were first operated by Shell in the year 1977, and as of the year of 2013 more than 200 FPSO vessels are being operated.

A dynamic positioning system (DPS) is a system that automatically maintains the position of a vessel and the direction of the bow of the vessel through a GPS signal using a propulsion system. The dynamic positioning system is the result of typical IT convergence technology in the shipbuilding and offshore plant industry.

Recently, in the offshore plant industry, it is a principal object to achieve the operation and the production in the deep sea. In order to withstand the deep sea environment, the average length and diameter of offshore plants have decreased, and the total cost of deep sea projects has increased due to the requirement for non-defective pipe lines and inhospitable installation environments.

Hereinafter, elementary technology for condition based maintenance in an offshore plant will be described with reference to the accompanying drawings.

Figure 1:
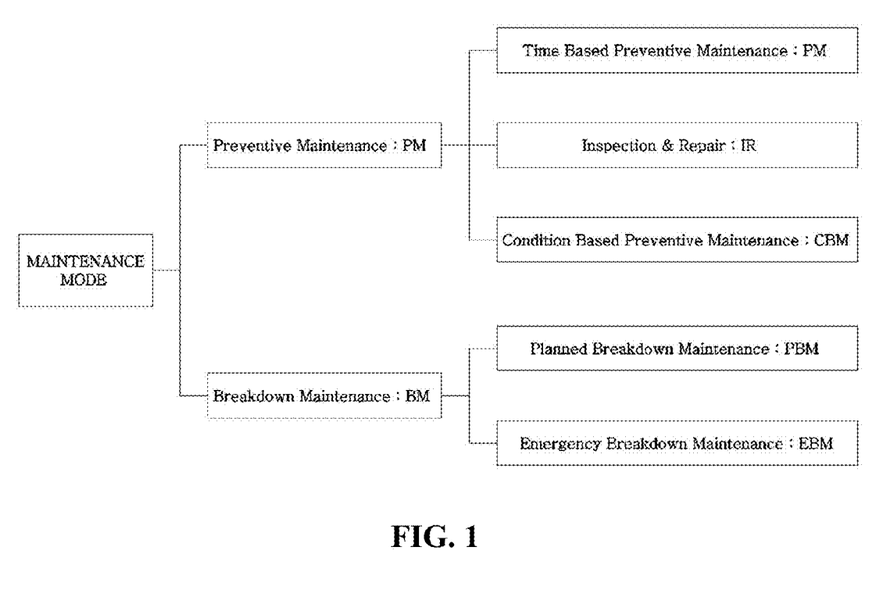
FIG. 1 is a view illustrating elementary technology for condition based maintenance in an offshore plant.

FIG. 1 is a view illustrating elementary technology for condition based maintenance in an offshore plant.

The British Standard Institution defines a process for diagnosing equipment based on observed data regarding the state of facilities and determining the necessity and time for maintenance based on the diagnosis results as condition based maintenance (CBM).

FIG. 1 shows the classification of maintenance policies. CBM is a kind of preventive maintenance, and time based maintenance (TBM) is another kind of preventive maintenance. TBM is a maintenance policy based on the reliability of equipment, whereas CBM is a maintenance policy based on a predictive technique.

In time based maintenance (TBM), the inspection and repair of facilities are periodically performed at predetermined time intervals. If the repair of facilities is periodically performed at intervals shorter or longer than the original life span of the facilities in consideration of the difference in deterioration among the facilities based on operating conditions, the facilities may break down due to variation in deterioration among the facilities. As a result, the repair intervals may be shortened, and the number of parts to be repaired may be increased. In addition, the condition of the facilities is deteriorated whenever the facilities are repaired, whereby the reliability of the facilities is reduced. As a result, the number of parts to be repaired may be increased, whereby repair costs may be increased.

Predictive maintenance (PM) is a method for predicting the failure of equipment and maintaining the equipment by measuring and monitoring whether the equipment has physically changed. When engine oil is inspected, any changes in color are observed, and maintenance is performed based on the observation results.

Condition based maintenance or condition based preventive maintenance (CBM) is a method for quantitatively observing the deterioration of facilities based on facility diagnosis or a control management system (CMS), and repairing the facilities when it is observed that the facilities are abnormal, in place of periodic inspection and repair of the facilities.

In addition, periodic diagnosis is performed in place of periodic repair, as in TBM. That is, facility diagnosis or condition monitoring is performed instead of periodic repair. As a result, the state of facilities is quantitatively monitored, whereby it is possible to maximally prevent any increase in maintenance cost due to excessive maintenance while preventing failure of the facilities. However, it is necessary to make a heavy investment to acquire the equipment and systems necessary for diagnosis. In order to reduce the cost necessary to introduce the equipment and systems, therefore, information communication technology (ICT) must be introduced.

Table 1 indicates various failure mechanisms.

TABLE 1

| Stress | Damage | Abnormal phenomena | Condition |
| --- | --- | --- | --- |
| Rotation | Crack | Surging | Vibration |
| Load | Peeling | Water hammer | Abnormal sound |
| Temperature | Deformation | Cavitation | Generation of heat |
| Pressure | Fracture | Beating | Emission of light |
| Speed | Wear | Whirling | Ultrasonic waves |
| Acceleration | Sticking | Looseness | Aftereffects |
| Environment | | Clogging | Current Voltage |

If a facility or components of the facility are excessively stressed due to the various failure mechanisms indicated in Table 1, damage and abnormalities may occur, which lead to a reduction in the performance of the facility. According to the circumstances, the facility may malfunction, with the result that the facility may break down.

Figure 2:
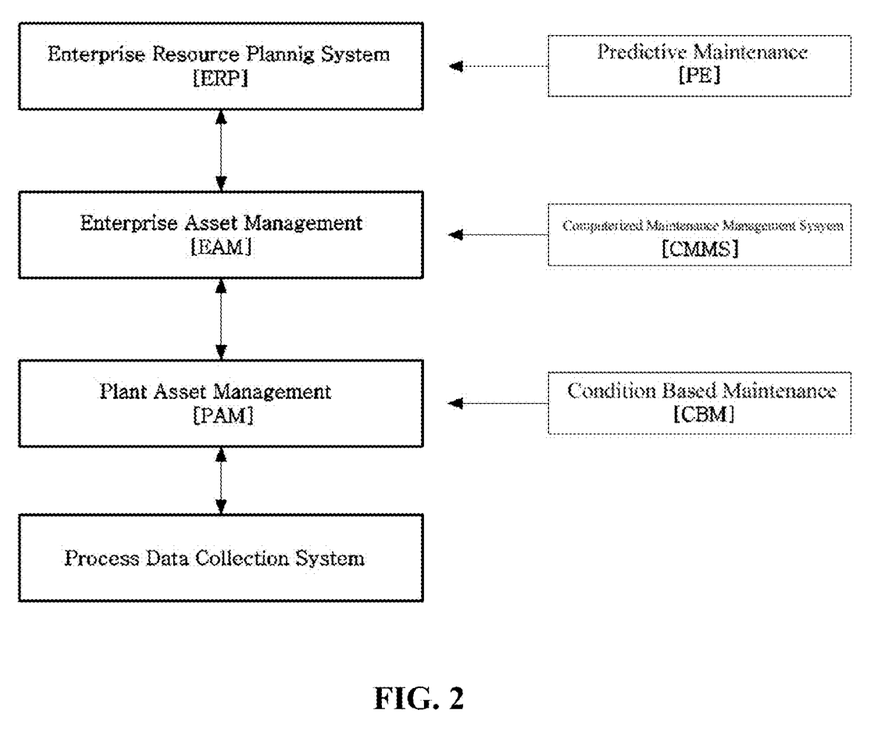
FIG. 2 is a view illustrating technology for condition based maintenance in a production plant.

FIG. 2 is a view illustrating technology for condition based maintenance in a production plant.

Technology related to condition based maintenance in the production plant may be connected with the existing basis systems that have been operated to date, and may be mapped as shown in FIG. 2. A plant information monitoring system (information regarding operation quality, a control system, facilities, a lubrication system, a hydraulic system, and a working oil system) is indicated in Table 2.

TABLE 2

| Plant information monitoring system (information regarding operation quality, a control system, facilities, a lubrication system, a hydraulic system, and a working oil system) | | | | |
| --- | --- | --- | --- | --- |
| Operation information | Control system information | Online monitoring | Transition phenomenon monitoring | Sampling information |
| 1. Line speed 2. Amount of electric power 3. Quality information | 1. Flow rate information 2. Temperature information 3. Valve information | 1. Seismic intensity 2. Temperature 3. Current | 1. Shaft vibration 2. Lubrication information 3. Process information | 1. Extent of pollution of lubricating oil 2. Extent of pollution of working oil 3. Extent of pollution of cooling water |

With the recent expansion of the asset management concept, Enterprise Resource Planning (ERP), Enterprise Asset Management (EAM), and Computerized Maintenance Management System (CMMS) are utilized to manage and monitor information about production plants. However, a total control system has not yet come onto the market.

In recent years, facility management has been mainly trending toward the management of assets rather than facilities over the total lifecycle of the assets based on the extension of the range of facilities and management regions instead of a conventional management method, which is focused on the maintenance and operation of facilities. In addition, facility management has been trending toward increased integration and connection with legacy information systems, such as the ERP, MES, and PLM.

In facility management in the past, it has been an object to reduce operating costs by reducing facility maintenance cost based on increasing productivity. In facility management based on EAM, on the other hand, a concept of realizing profit from facilities is pursued, which is different from the existing facility management system.

In the 2000s, EAM became a fundamental concept for developing and operating a computer-aided facility management system, which is an improved management system that is an incremental development over the existing CMMS. In recent years, asset lifecycle management (ALM), which is a concept of performing management over the entire lifecycle of enterprise assets by extending the range of EAM, has come into existence.

In order to introduce maintenance technique based on CBM, sequential application is necessary based on the level of the existing system. Specifically, three classes of CBM systems may be introduced.

First, a simple CBM system, CBM3, is the least expensive CBM system, and periodically diagnoses the state of facilities in a simple fashion through inspection using the five senses or using a simple portable diagnostic instrument, thereby determining maintenance actions.

Next, an intermediate CBM system, CBM2, is the best known CBM system, and represents an expansion of the simple CBM system to periodically diagnose the state of facilities using a precise diagnostic instrument, i.e. a system that determines a maintenance policy based on periodic simple diagnosis and periodic precise diagnosis.

Finally, a high-class CBM system, CBM1, is a high-grade CBM system that includes continuous facility monitoring having an automatic diagnosis function. The CBM system CBM1 is used only for high-priced critical machines. At present, leading foreign diagnosis and control companies are manufacturing high-class CBM systems.

In order to apply the above-described CBM system to offshore plants that have been used for more than 30 years, however, it is necessary to develop a system that is capable of supporting asset information management and communication based on international standards. Specifically, a new concept surpassing the high-class CBM system is needed.

In the conventional systems, high operation and maintenance costs are required due to operation for a long time, and damage and accidents may occur due to human error, inexperienced inspectors, or the like. For these reasons, there is a high necessity for securing and localizing original technology for condition based maintenance.

An example of the related arts is disclosed in Korean Patent Application Publication No. 10-2011-0129276 (published on Dec. 1, 2011) entitled "AUTOMATED MAINTENANCE SYSTEM FOR FLOATING TYPE STRUCTURES."

Another example of the related arts is disclosed in Korean Patent Application Publication No. 10-2013-0114515 (published on Oct. 18, 2013) entitled "SYSTEM AND METHOD FOR STATICALLY AND DYNAMICALLY POSITIONING OFFSHORE STRUCTURE USING REAL-TIME MONITORING OF SIX DEGREE OF FREEDOM MOTION OF THE POSITIONING OFFSHORE STRUCTURE."

Another example of the related arts is disclosed in Korean Patent Application Publication No. 10-2012-0085223 (published on Jul. 31, 2012) entitled "AUTOMATED MAINTENANCE SYSTEM FOR FLOATING TYPE STRUCTURES."

A further example of the related arts is disclosed in Korean Patent Application Publication No. 10-2014-0025803 (published on Mar. 5, 2014) entitled "SYSTEM AND METHOD FOR MAINTAINING DYNAMIC POSITION OF FLOATING OFFSHORE STRUCTURE."

SUMMARY OF THE INVENTION

Therefore, the present invention has been made in view of the above problems, and it is an object of the present invention to provide a method and apparatus for managing failure modes for condition based maintenance in marine resource production equipment that enable an offshore plant to be totally operated and maintained based on condition based maintenance through the development of supervisory control and data acquisition (SCADA) for the offshore plant based on a distributed control system, a solution for condition based maintenance in the offshore plant, and a virtual offshore plant operating system configured to verify an offshore plant related system.

In accordance with an aspect of the present invention, the above and other objects can be accomplished by the provision of an apparatus for managing failure modes for condition based maintenance in marine resource production equipment, the apparatus including a distributed control system (DCS), monitoring, and performance evaluation module that constructs a distributed control system for the systematic collection and management of maintenance data, develops a real-time data management and monitoring system, and develops an offshore plant performance monitoring level performance evaluation system, a condition based maintenance platform that maps data from a real-time sensor database of the distributed control system (DCS), monitoring, and performance evaluation module, stores the mapped data, and manages learnable failure modes based on normal mode and failure mode data, a diagnosis, prediction, maintenance, and shape management module that develops technology for automatically improving reliability of condition based maintenance based on learnable failure mode management according to data transmitted from the distributed control system (DCS), monitoring, and performance evaluation module to the condition based maintenance platform, develops an offshore plant diagnosis, prediction, and maintenance system, and develops a diagnosis and condition based maintenance operating platform and a shape management system, and a virtual offshore plant simulator that constructs a virtual offshore plant simulator, constructs a scenario based operation training system, and develops a condition based maintenance solution and an input and output virtualization system for interoperation with a supervisory control and data acquisition (SCADA) system for an offshore plant.

The distributed control system (DCS), monitoring, and performance evaluation module may include a distributed control system (DCS) for an offshore plant that collects data according to a control signal, a monitoring system that monitors the top side, the hull, the subsea region, and the environmental load using the collected data from the distributed control system (DCS) for the offshore plant, a real-time sensor and operation database (DB) that stores the data monitored by the monitoring system, a real-time sensor data database (DB) that stores sensor data based on data from the real-time sensor and operation database (DB), and a performance evaluation system that evaluates system performance, such as an operation history, a performance index, performance calculation, and a performance history, based on a platform independent model (PIM) and a platform specific model (PSM), the performance evaluation system being connected to the distributed control system (DCS) for the offshore plant to perform control processing from a total control system.

The condition based maintenance platform may include a data mapping server that maps data from the real-time sensor data database (DB) of the distributed control system (DCS), monitoring, and performance evaluation module, and stores the mapped data in a diagnosis, prediction, and maintenance data mart and a normal mode and failure mode database (DB), and a learnable failure mode management system that manages learnable failure modes based on the data in the normal mode and failure mode database (DB).

The diagnosis, prediction, maintenance, and shape management module may include an intelligent diagnosis system that performs general diagnosis, and analyzes a malfunction likelihood and a failure likelihood, a prediction system that analyzes failure modes, predicts a remaining life span, and learns the failure modes, a maintenance system that analyzes causes of failure, analyzes a severity and reliability block diagram (RBD), and determines maintenance, and a shape management system that manages requirements, base lines, the configuration and change of a plant, and matchability based on product information data and maintenance history data.

The virtual offshore plant simulator may include an input and output virtualization system that operates on information provided from a shipyard, using a virtual offshore plant operating system including a virtualization system and an operating control system based on a virtual reality model database (DB) and a training scenario database (DB) including production process monitoring and control, field worker training, interoperation with field operators, education for emergency response, and other real situation scenarios according to a process simulation model based on control information from the distributed control system (DCS) for the offshore plant, and transmits control results based on the operation to the distributed control system (DCS) for the offshore plant.

The monitoring system may interoperate with the operating control system, and may feed images back to the virtual offshore plant operating system.

In accordance with another aspect of the present invention, there is provided a method for managing failure modes for condition based maintenance in marine resource production equipment, the method including completing a failure mode database (DB) through failure mode pattern recognition and intellectualization based on normal mode pattern analysis and intellectualization, determination between normal and failure modes and intellectualization, and failure mode pattern decision and intellectualization after the construction of an initial database (DB) to approve failure mode and normal mode data, collecting marine SCADA data, monitoring the collected marine SCADA data, performing diagnosis through the failure mode database (DB) based on the monitoring results, performing prediction based on the diagnosis results, performing decision-making based on the prediction results, and maintaining contents regarding the decision-making.

The failure mode database (DB), completed through the failure mode pattern recognition and intellectualization, may be used as a knowledge based reliability database (DB) through the reuse of knowledge.

The failure mode database (DB) may be applied to learnable failure mode management knowledge base technology through engineering simulator data, shipyard technology data, onshore plant field data, and reliability data such that the failure mode database (DB) can be provided as an offshore plant engineering knowledge service.

The step of collecting the marine SCADA data may include duplicating the distributed control system (DCS) of the distributed control system (DCS), monitoring, and performance evaluation module such that the distributed control system (DCS) can perform real-time large-capacity data collection and monitoring, and performing a smart sensor network standard protocol, i.e. a highway addressable remote transducer (HART) interface, with respect to field equipment.

In accordance with a further aspect of the present invention, there is provided a method for testing a virtual offshore plant to verify an offshore plant related system using an apparatus for managing failure modes for condition based maintenance in marine resource production equipment, the method including constructing a virtual offshore plant operating system including an input and output simulator, a visualization system, and an operating control system, and constructing a virtual reality three-dimensional (3D) model database based on the drafts of a shipyard and a process simulation model, to construct a virtual offshore plant test bed including a training scenario database (DB), connecting the input and output simulator to the distributed control system (DCS) for the offshore plant, the visualization system visualizing the virtual reality 3D model database based on the drafts of the shipyard and the process simulation model, and the operating control system performing operation training based on a training scenario database (DB) and the visualization system.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Reference will now be made in detail to the preferred embodiments of the present invention, examples of which are illustrated in the accompanying drawings.

Although most terms used in the present invention have been selected from general ones widely used in the art, some terms have been arbitrarily selected by the applicant, and their meanings are explained in detail in the following description as needed. Thus, the present invention should be understood with the intended meanings of the terms rather than their simple names or meanings. In addition, in the following description of the present invention, a detailed description of known functions and configurations incorporated herein will be omitted when it may obscure the subject matter of the present invention. In the drawings, some components are exaggerated or reduced for the same reason.

Condition based maintenance (CBM) is a kind of maintenance that is performed to predict the life span of equipment based on expert diagnosis of the state of the equipment and that enables the equipment to smoothly operate until the life span of the equipment expires.

Up to now, preventive maintenance and predictive maintenance have been mainly used.

Preventive maintenance is a kind of maintenance that is intentionally performed to prevent equipment from failing or coming to a halt during the use of the equipment by maintaining the parts of the equipment in a usable state. For example, for a vehicle, engine oil may be periodically changed every 5,000 km.

Predictive maintenance is a kind of maintenance that is performed to predict the failure of equipment by monitoring whether the equipment has physically changed. For example, when an oil gauge is inspected, aging of the equipment may be recognized based on the change of color.

Condition based maintenance is a kind of maintenance that is performed to predict the life span of equipment based on expert diagnosis of the state of the equipment and that enables the equipment to smoothly operate until the life span of the equipment expires. For example, the remaining life span of engine oil may be predicted and provided to a user (or an operator) even in a state in which the user (or the operator) does not recognize the remaining life span of the engine oil.

Figure 3:
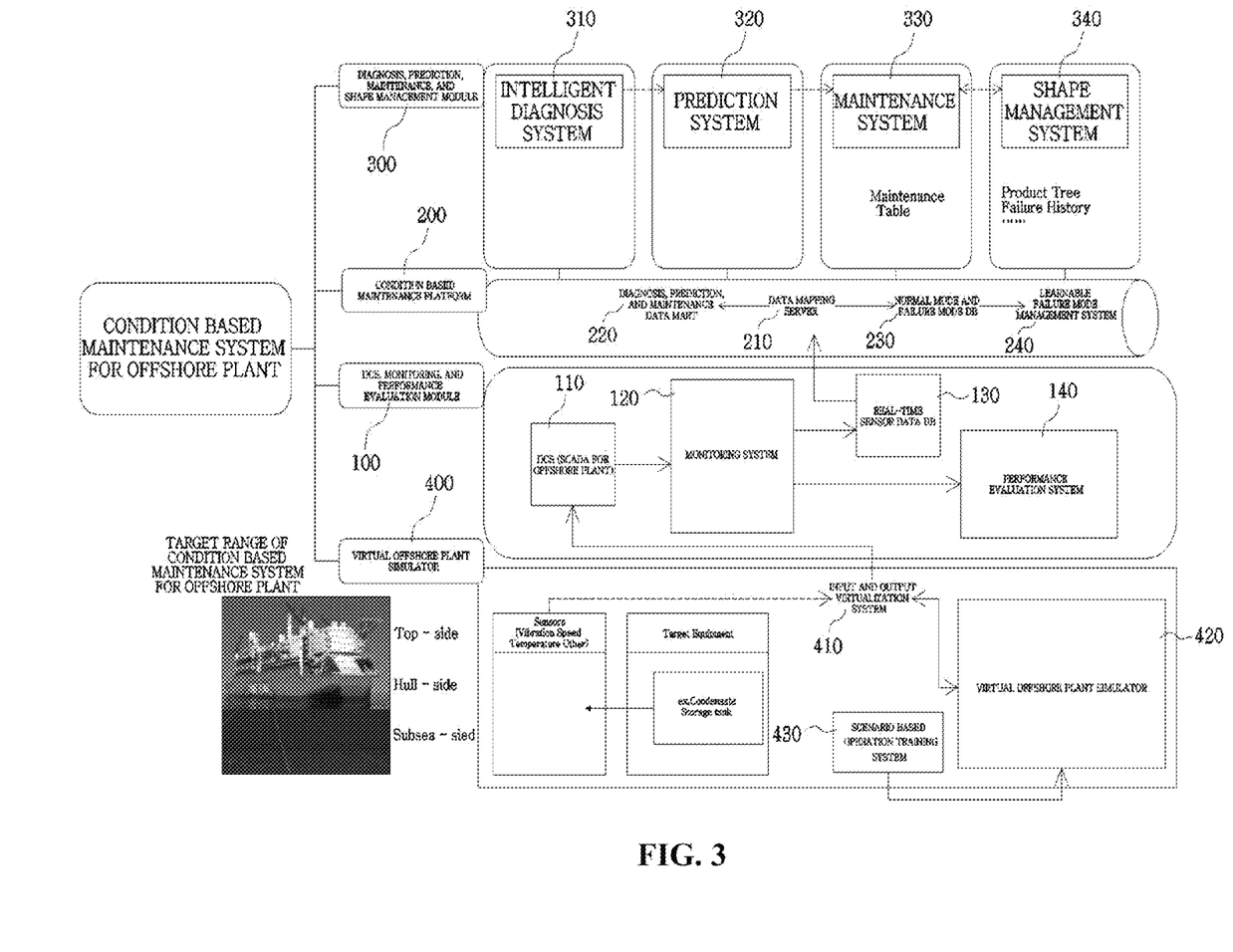
FIG. 3 is a view illustrating an apparatus for managing failure modes for condition based maintenance in marine resource production equipment according to the present invention.
Figure 4:
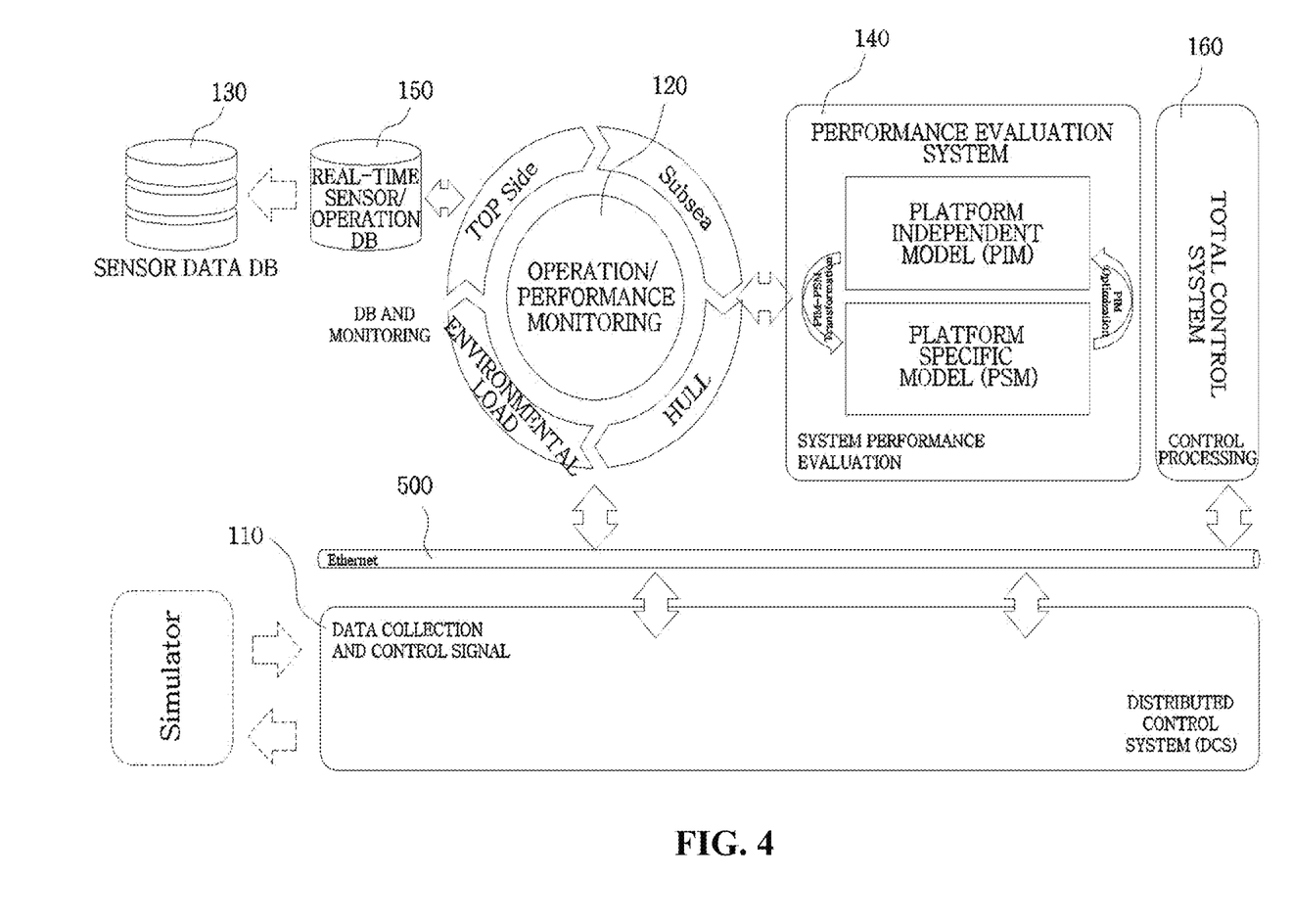
FIG. 4 is a view showing a supervisory control and data acquisition (SCADA) system for an offshore plant based on a distributed control system, which is included in the apparatus for managing failure modes for condition based maintenance in marine resource production equipment shown in FIG. 3, in detail.
Figure 5:
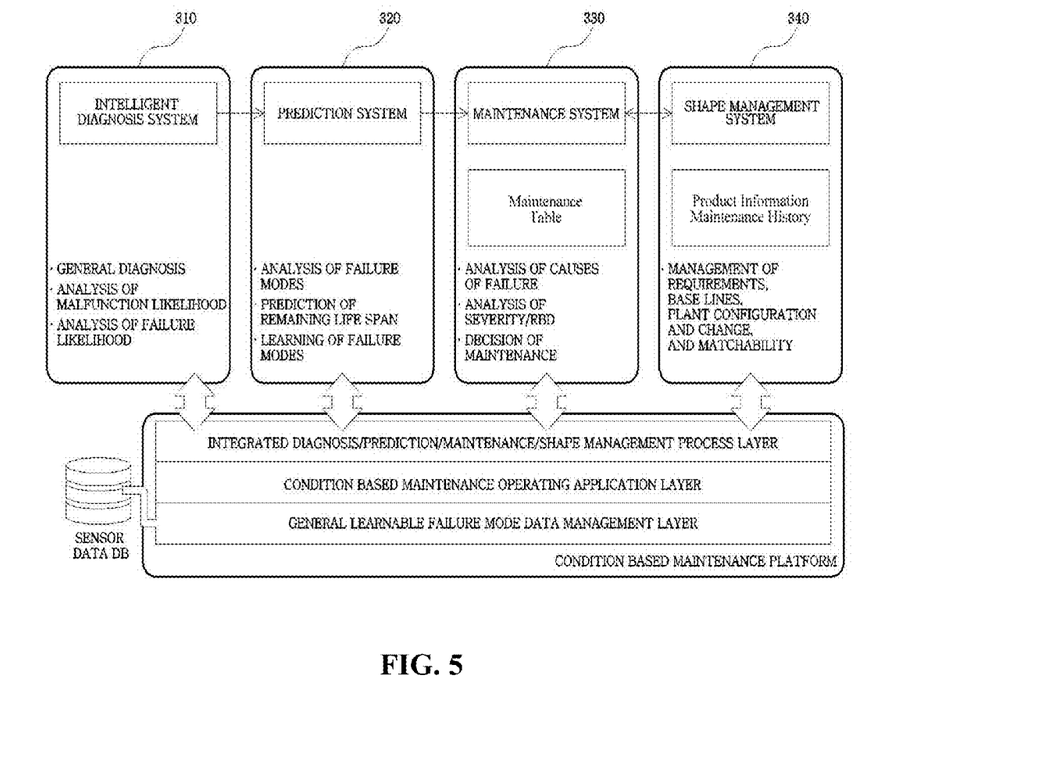
FIG. 5 is a view showing a solution for condition based maintenance in an offshore plant based on learnable failure mode management, which is included in the apparatus for managing failure modes for condition based maintenance in marine resource production equipment shown in FIG. 3, in detail.
Figure 6:
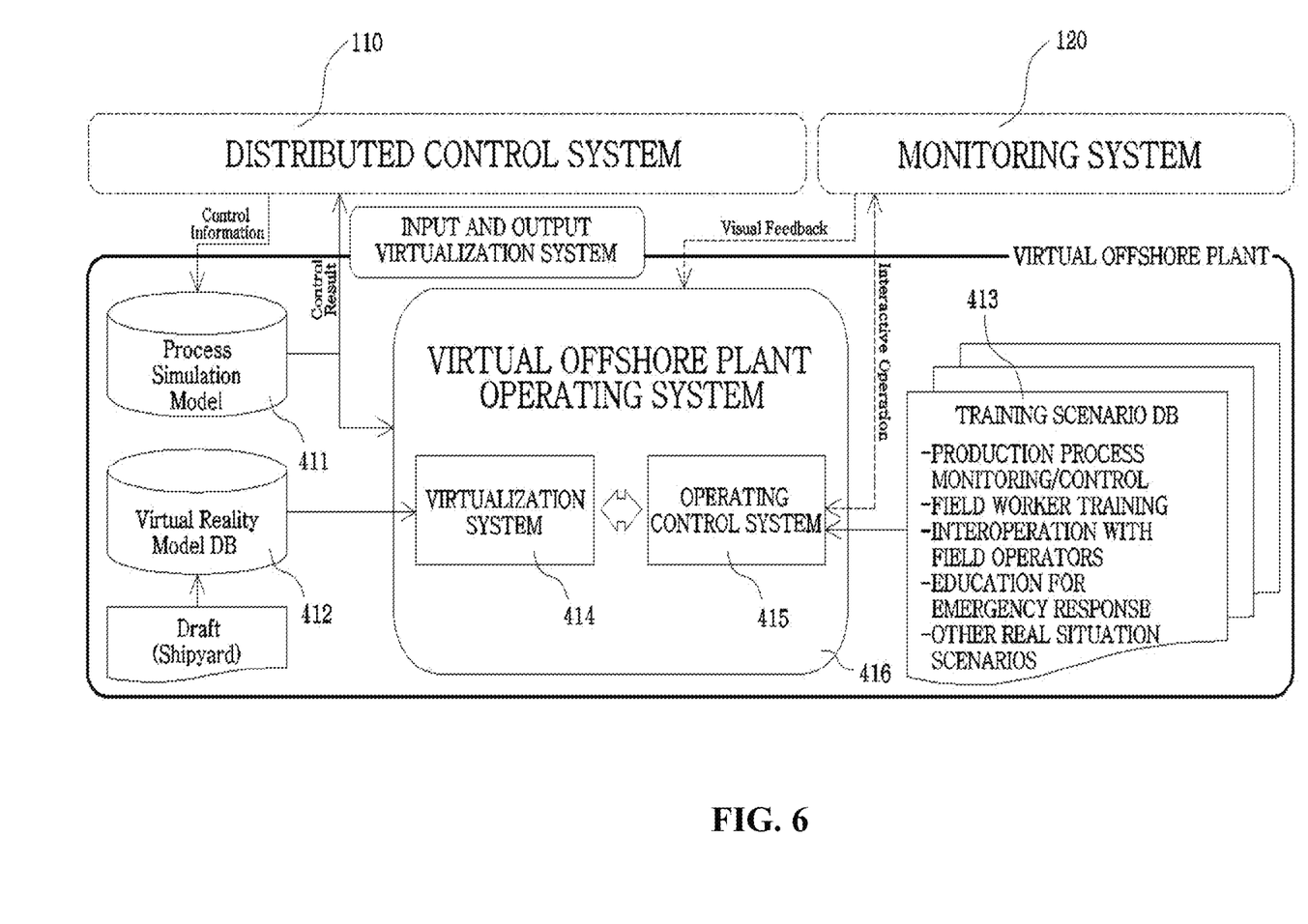
FIG. 6 is a view showing a virtual offshore plant operating system, which is included in the apparatus for managing failure modes for condition based maintenance in marine resource production equipment shown in FIG. 3, in detail.

FIG. 3 is a view illustrating an apparatus for managing failure modes for condition based maintenance in marine resource production equipment according to the present invention, FIG. 4 is a view showing a supervisory control and data acquisition (SCADA) system for an offshore plant based on a distributed control system, which is included in the apparatus for managing failure modes for condition based maintenance in marine resource production equipment shown in FIG. 3, in detail, FIG. 5 is a view showing a solution for condition based maintenance in an offshore plant based on learnable failure mode management, which is included in the apparatus for managing failure modes for condition based maintenance in marine resource production equipment shown in FIG. 3, in detail, and FIG. 6 is a view showing a virtual offshore plant operating system, which is included in the apparatus for managing failure modes for condition based maintenance in marine resource production equipment shown in FIG. 3, in detail.

As shown in FIGS. 3 to 6, the apparatus for managing failure modes for condition based maintenance in marine resource production equipment according to the present invention includes a distributed control system (DCS), monitoring, and performance evaluation module 100, a condition based maintenance platform 200, a diagnosis, prediction, maintenance, and shape management module 300, and a virtual offshore plant simulator 400.

The distributed control system (DCS), monitoring, and performance evaluation module 100 includes a distributed control system (DCS) 110 for an offshore plant, a monitoring system 120, a real-time sensor data database (DB) 130, and a performance evaluation system 140, which constructs a distributed control system for the systematic collection and management of maintenance data, develops a real-time data management and monitoring system, and develops an offshore plant performance monitoring level performance evaluation system.

The distributed control system (DCS) 110 for the offshore plant collects data according to a data collection and control signal, and transmits the collected data to the monitoring system 120 via a communication network (e.g. Ethernet) 500.

The monitoring system 120 monitors the top side, the hull, the subsea region, and the environmental load, and stores the monitored data in a real-time sensor and operation database (DB) 150. The real-time sensor and operation database (DB) 150 is stored in the real-time sensor data database (DB) 130.

The performance evaluation system 140 evaluates system performance, such as an operation history, a performance index, performance calculation, and a performance history, based on a platform independent model (PIM) and a platform specific model (PSM). The performance evaluation system 140 is connected to the distributed control system (DCS) via a total control system 160 over the communication network 500 to perform control processing from the total control system 160.

The condition based maintenance platform 200 includes a data mapping server 210, a diagnosis, prediction, and maintenance data mart 220, a normal mode and failure mode database (DB) 230, and a learnable failure mode management system 240.

The data mapping server 210 maps data from the real-time sensor data database (DB) 130 of the distributed control system (DCS), monitoring, and performance evaluation module 100, and stores the mapped data in the diagnosis, prediction, and maintenance data mart 220 and the normal mode and failure mode database (DB) 230.

The learnable failure mode management system 240 manages learnable failure modes based on the data in the normal mode and failure mode database (DB) 230.

The diagnosis, prediction, maintenance, and shape management module 300 includes an intelligent diagnosis system 310, a prediction system 320, a maintenance system 330, and a shape management system 340, which are used to develop technology for automatically improving the reliability of condition based maintenance based on the learnable failure mode management according to data transmitted from the real-time sensor data database (DB) 130 to the data mapping server 210, to develop an offshore plant diagnosis, prediction, and maintenance system, and to develop a diagnosis and condition based maintenance operating platform and a shape management system.

The intelligent diagnosis system 310 performs general diagnosis, and analyzes a malfunction likelihood or a failure likelihood.

The prediction system 320 analyzes failure modes, predicts the remaining life span, and learns the failure modes.

The maintenance system 330 analyzes the causes of failure, analyzes a severity and reliability block diagram (RBD), and determines maintenance.

The shape management system 340 manages requirements and base lines, configures and changes a plant, and manages matchability based on product information data and maintenance history data.

The virtual offshore plant simulator 400 includes an input and output virtualization system 410, a virtual offshore plant operating system (simulator) 420, and a scenario based operation training system 430, which construct a virtual offshore plant simulator, construct a scenario based operation training system, and develop a condition based maintenance solution and an input and output virtualization system for interoperation with the SCADA system for the offshore plant.

The input and output virtualization system 410 operates on information, such as three-dimensional (3D) computer-aided design (CAD) data and process flow diagrams (PFDs), provided from a shipyard, using a virtual offshore plant operating system 416, which includes a virtualization system 414 and an operating control system 415 based on a virtual reality model database (DB) 412 and a training scenario database (DB) 413, according to a process simulation model 411 based on control information from the distributed control system (DCS) 110 for the offshore plant, and transmits the control results based on the operation to the distributed control system (DCS) 110.

At this time, the monitoring system 120 interoperates with the operating control system 415, and feeds images back to the virtual offshore plant operating system 416.

Meanwhile, the training scenario database (DB) 413 includes production process monitoring and control, field worker training, interoperation with field operators, education for emergency response, and other real situation scenarios.

Figure 7:
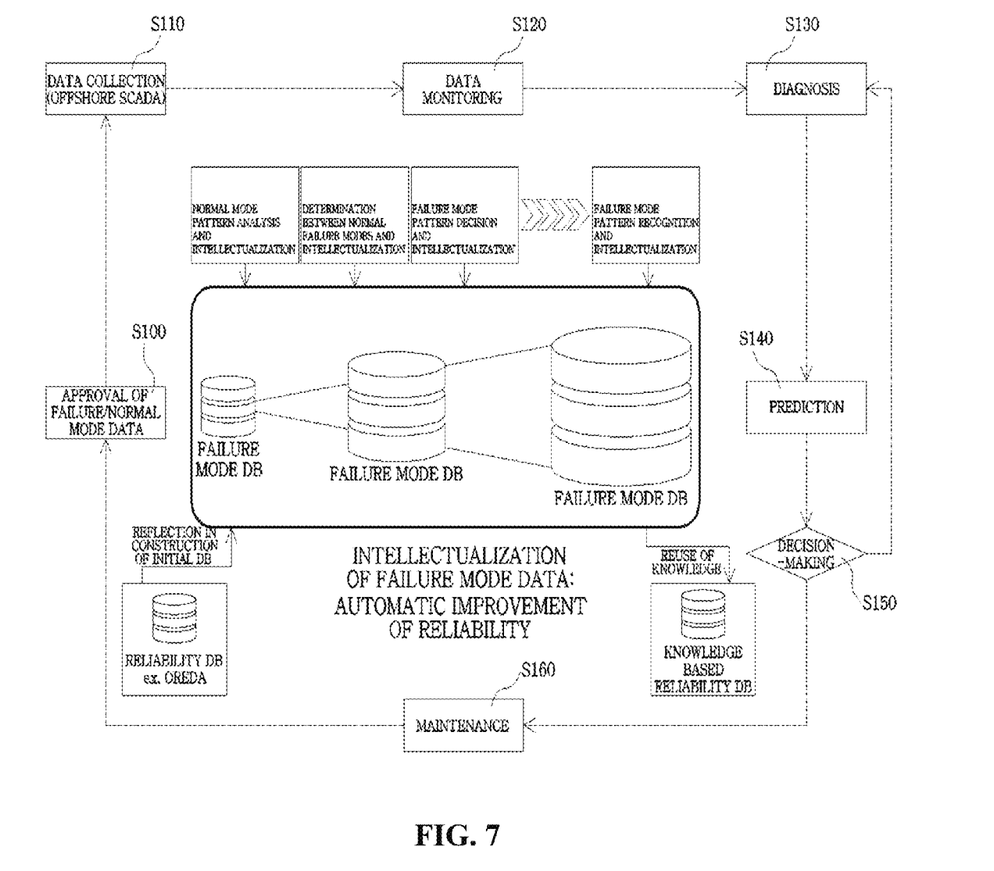
FIG. 7 is a view illustrating a method for improving the reliability of condition based maintenance based on learnable failure mode management using the apparatus for managing failure modes for condition based maintenance in marine resource production equipment shown in FIG. 3.
Figure 8:
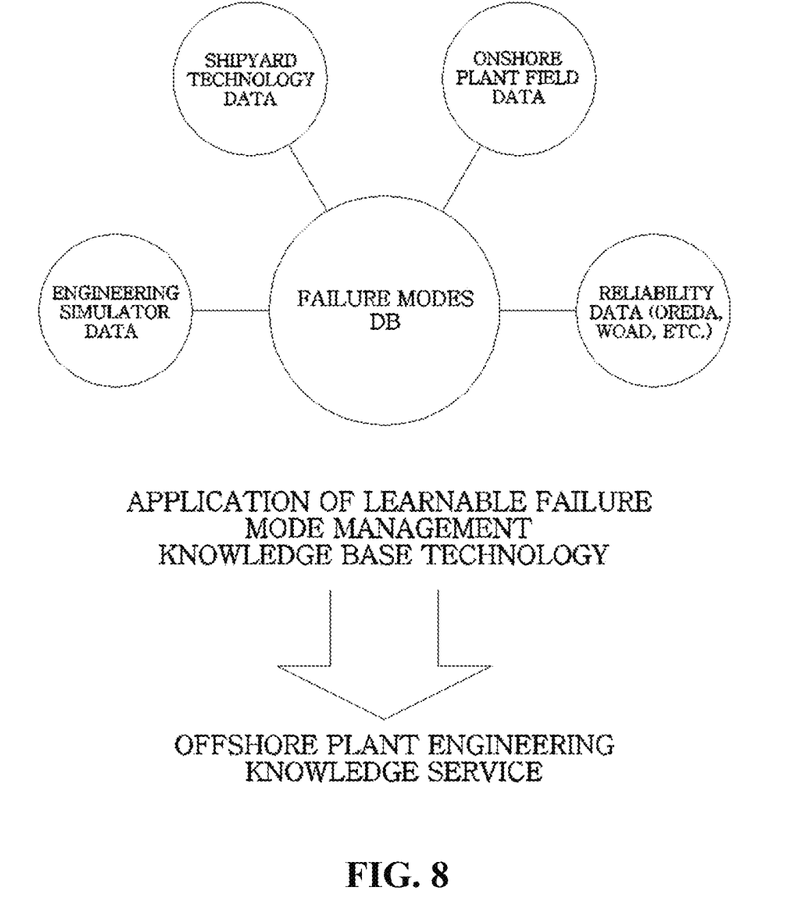
FIG. 8 is a view illustrating a failure mode database (DB) for condition based maintenance, which is used in the apparatus for managing failure modes for condition based maintenance in marine resource production equipment shown in FIG. 3.

FIG. 7 is a view illustrating a method for improving reliability of condition based maintenance based on learnable failure mode management using the apparatus for managing failure modes for condition based maintenance in marine resource production equipment shown in FIG. 3, and FIG. 8 is a view illustrating a failure mode database (DB) for condition based maintenance, which is used in the apparatus for managing failure modes for condition based maintenance in marine resource production equipment shown in FIG. 3.

In the method for improving the reliability of condition based maintenance based on learnable failure mode management using the apparatus for managing failure modes for condition based maintenance in marine resource production equipment, as shown in FIG. 7, a failure mode database (DB) is completed through failure mode pattern recognition and intellectualization based on normal mode pattern analysis and intellectualization, determination between normal and failure modes and intellectualization, and failure mode pattern decision and intellectualization, using a failure report database, i.e. offshore reliability data (OREDA), after the construction of an initial database (DB).

For reference, OREDA are provided to achieve maintenance and operation data analysis, reliability conversion, and the establishment of a high-quality reliability database through the collection of reliability data for safety devices based on failure reports and to reduce design costs while improving safety through the maintenance of facilities and safety technology (RAMS), in which several companies participate. For example, OREDA-97 is data regarding 11,150 failure events for 7,600 facility units, which were collected by 10 European oil refining companies.

In the present invention, failure mode and normal mode data are approved (S100) using the failure mode database (DB) completed through the failure mode pattern recognition and intellectualization, marine SCADA data are collected (S110), the collected marine SCADA data are monitored (S120), and diagnosis is performed through the failure mode database (DB) based on the monitoring results (S130). Subsequently, prediction is performed (S140), decision-making is performed (S150), and maintenance is performed (S160). Meanwhile, the failure mode database (DB), completed through the failure mode pattern recognition and intellectualization, is used as a knowledge based reliability database (DB) through the reuse of knowledge.

Meanwhile, in the apparatus for managing failure modes for condition based maintenance in marine resource production equipment, the failure mode database (DB) for condition based maintenance is applied to learnable failure mode management knowledge base technology through engineering simulator data, shipyard technology data, onshore plant field data, and reliability data (e.g. OREDA and WOAD) such that the failure mode database (DB) for condition based maintenance can be provided as an offshore plant engineering knowledge service.

Figure 9:
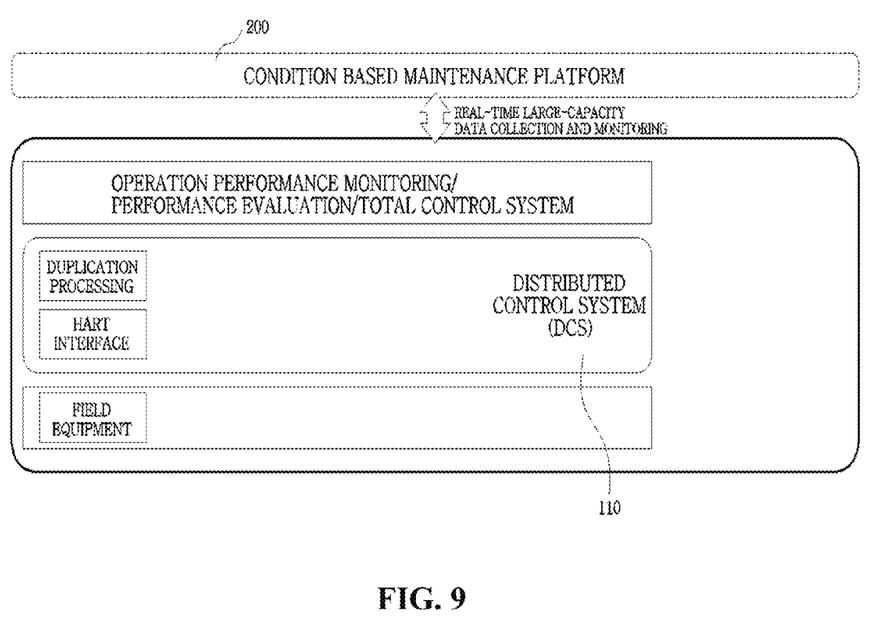
FIG. 9 is a view illustrating the establishment of the SCADA system for the offshore plant based on the distributed control system, which is included in the apparatus for managing failure modes for condition based maintenance in marine resource production equipment shown in FIG. 3.

FIG. 9 is a view illustrating the establishment of the SCADA system for the offshore plant based on the distributed control system, which is included in the apparatus for managing failure modes for condition based maintenance in marine resource production equipment shown in FIG. 3.

In order to establish the SCADA system for the offshore plant based on the distributed control system, which is included in the apparatus for managing failure modes for condition based maintenance in marine resource production equipment according to the present invention, as shown in FIG. 9, the distributed control system (DCS) 110 is duplicated such that the distributed control system (DCS), monitoring, and performance evaluation module 100, and the condition based maintenance platform 200 can perform real-time large-capacity data collection and monitoring, and a smart sensor network standard protocol, i.e. a Highway Addressable Remote Transducer (HART) interface, is used.

Consequently, it is possible to construct a real-time large-capacity data collection and operation performance monitoring and evaluation system based on the distributed control system (DCS), which is one of the components constituting a real offshore plant, to perform real-time large-capacity data collection based on the HART standard, and to secure stable system reliability for data collection through duplication processing.

Figure 10:
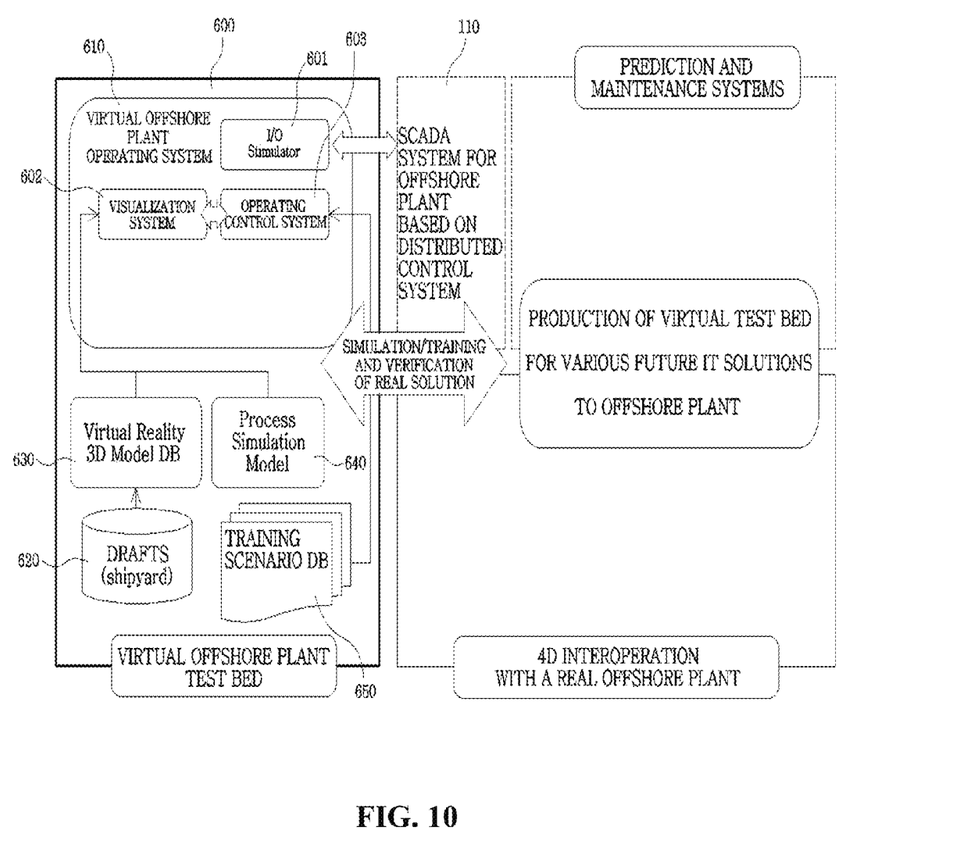
FIG. 10 is a view illustrating a virtual offshore plant system for verifying an offshore plant related system in the apparatus for managing failure modes for condition based maintenance in marine resource production equipment shown in FIG. 3.

FIG. 10 is a view illustrating a virtual offshore plant system for verifying an offshore plant related system in the apparatus for managing failure modes for condition based maintenance in marine resource production equipment shown in FIG. 3.

In the apparatus for managing failure modes for condition based maintenance in marine resource production equipment, the virtual offshore plant system for verifying the offshore plant related system first constructs a virtual offshore plant test bed 600. The virtual offshore plant test bed 600 includes a virtual offshore plant operating system 610, which includes an input and output simulator 601, a visualization system 602, and an operating control system 603, a virtual reality 3D model database 630 based on drafts (e.g. the drafts of a shipyard) 620, a process simulation model 640, and a training scenario database (DB) 650.

The input and output simulator 601 is connected to the distributed control system (DCS) 110 for the offshore plant based on the distributed control system shown in FIG. 4.

The visualization system 602 visualizes the virtual reality 3D model database 630 based on the drafts (e.g. the drafts of the shipyard) 620 and the process simulation model 640.

The operating control system 603 performs operation training based on the training scenario database (DB) 650 and the visualization system 602.

Consequently, the virtual offshore plant test bed 600 may be connected to the distributed control system (DCS) 110 for the offshore plant based on the distributed control system, the prediction system 320, and the maintenance system 330 via the input and output simulator 601, whereby it is possible to produce a virtual test bed for various future IT solutions for the offshore plant.

In addition, four-dimensional (4D) interoperation with a real offshore plant may also be possible.

As is apparent from the above description, the present invention has the following effects.

First, it is possible to construct a real-time large-capacity data collection and operation performance monitoring and evaluation system based on the distributed control system (DCS), which is one of the components constituting a real offshore plant.

Second, it is possible to perform real-time large-capacity data collection based on the HART standard, Third, it is possible to secure stable system reliability for data collection through duplication processing.

Fourth, it is possible to enable an offshore plant to be totally operated and maintained based on condition based maintenance through the development of supervisory control and data acquisition (SCADA) for the offshore plant based on the distributed control system, a solution for condition based maintenance of the offshore plant, and a virtual offshore plant operating system configured to verify an offshore plant related system, thereby achieving efficient and optimal operation of facilities. Consequently, it is possible to achieve progressive operation and maintenance that goes beyond mere prevention.

It will be apparent that, although the embodiments of the present invention have been described above with reference to the accompanying drawings, the present invention is not limited to the above-described specific embodiments, and therefore various modifications and variations can be made by those skilled in the art without departing from the gist of the appended claims. Thus, it is intended that the modifications and variations should not be understood independently of the technical spirit or prospect of the present invention. The above embodiments are therefore to be construed in all aspects as illustrative and not restrictive.

What is claimed is:

1. An apparatus for managing failure modes for condition based maintenance in marine resource production equipment, the apparatus comprising:
a performance evaluation module comprising a distributed control system (DCS) for an offshore plant that collects maintenance data, a monitoring system that monitors a top side, a hull, a subsea region, and an environmental load using the collected data from the distributed control system (DCS) for the offshore plant, a realtime sensor and operation database (DB) that stores the data monitored by the monitoring system, and a real-time sensor data database (DB) that stores sensor data based on data from the real-time sensor and operation database (DB), the performance evaluation module being configured to construct a distributed control system for systematic collection and management of maintenance data and to evaluate real-time data management and monitoring performance;
a condition based maintenance platform that maps data from real-time sensor data of the performance evaluation module, stores the mapped data, and manages learnable failure modes based on normal mode and failure mode data;
a diagnosis, prediction, maintenance, and shape management module comprising a data mapping server that maps data from the real-time sensor data database (DB) of the performance evaluation module, and stores the mapped data in a diagnosis, prediction, and maintenance data mart and a normal mode and failure mode database (DB) and a learnable failure mode management system that manages learnable failure modes based on the data in the normal mode and failure mode database (DB), the diagnosis, prediction, maintenance, and shape management module being configured to develop technology for automatically improving reliability of condition based maintenance based on learnable failure mode management according to data transmitted from the performance evaluation module to the condition based maintenance platform, an offshore plant diagnosis, prediction, and maintenance system, a diagnosis and condition based maintenance operating platform, and a shape management system; and
a virtual offshore plant simulator that constructs a virtual offshore plant simulator, constructs a scenario based operation training system, and develops a condition based maintenance solution and an input and output virtualization system for interoperation with a supervisory control and data acquisition (SCADA) system for an offshore plant.

2. The apparatus according to claim 1, wherein the performance evaluation module further comprises a performance evaluation system that evaluates system performance, including an operation history, a performance index, performance calculation, and a performance history, based on a platform independent model (PIM) and a platform specific model (PSM), the performance evaluation system being connected to the distributed control system (DCS) for the offshore plant to perform control processing from a total control system.

3. The apparatus according to claim 1, wherein the diagnosis, prediction, maintenance, and shape management module comprises:
an intelligent diagnosis system that performs general diagnosis, and analyzes a malfunction likelihood and a failure likelihood;
a prediction system that analyzes failure modes, predicts a remaining life span, and learns the failure modes;
a maintenance system that analyzes causes of failure, analyzes a severity and reliability block diagram (RBD), and determines maintenance; and
a shape management system that manages requirements and base lines, configures and changes a plant, and manages matchability based on product information data and maintenance history data.

4. The apparatus according to claim 1, wherein the virtual offshore plant simulator comprises an input and output virtualization system that operates on information provided from a shipyard, using a virtual offshore plant operating system comprising a virtualization system and an operating control system based on a virtual reality model database (DB) and a training scenario database (DB) comprising production process monitoring and control, field worker training, interoperation with field operators, and education for emergency response according to a process simulation model based on control information from the distributed control system (DCS) for the offshore plant, and transmits control results based on the operation to the distributed control system (DCS) for the offshore plant.

5. The apparatus according to claim 4, wherein the monitoring system interoperates with the operating control system, and feeds images back to the virtual offshore plant operating system.

6. A method for managing failure modes for condition based maintenance in marine resource production equipment using the apparatus for managing failure modes for condition based maintenance in marine resource production equipment according to claim 1, the method comprising:
completing a failure mode database (DB) through failure mode pattern recognition and intellectualization based on normal mode pattern analysis and intellectualization, determination between normal and failure modes and intellectualization, and failure mode pattern decision and intellectualization after construction of an initial database (DB) to approve failure mode and normal mode data;
collecting marine SCADA data;
monitoring the collected marine SCADA data;
performing diagnosis through the failure mode database (DB) based on the monitoring results;
performing prediction based on the diagnosis results;
performing decision-making based on the prediction results; and
maintaining contents regarding the decision-making.

7. The method according to claim 6, wherein the failure mode database (DB) completed through the failure mode pattern recognition and intellectualization is used as a knowledge based reliability database (DB) through reuse of knowledge.

8. The method according to claim 7, wherein the failure mode database (DB) is applied to learnable failure mode management knowledge base technology through engineering simulator data, shipyard technology data, onshore plant field data, and reliability data such that the failure mode database (DB) is provided as an offshore plant engineering knowledge service.

9. The method according to claim 8, wherein the step of collecting the marine SCADA data comprises: duplicating the distributed control system of the performance evaluation module such that the distributed control system performs real-time large-capacity data collection and monitoring; and performing a smart sensor network standard protocol with respect to field equipment.

10. A method for managing failure modes for condition based maintenance in marine resource production equipment using the apparatus for managing failure modes for condition based maintenance in marine resource production equipment according to claim 2, the method comprising:
    completing a failure mode database (DB) through failure mode pattern recognition and intellectualization based on normal mode pattern analysis and intellectualization, determination between normal and failure modes and intellectualization, and failure mode pattern decision and intellectualization after construction of an initial database (DB) to approve failure mode and normal mode data;
    collecting marine SCADA data;
    monitoring the collected marine SCADA data;
    performing diagnosis through the failure mode database (DB) based on the monitoring results;
    performing prediction based on the diagnosis results;
    performing decision-making based on the prediction results; and
    maintaining contents regarding the decision-making.

11. A method for managing failure modes for condition based maintenance in marine resource production equipment using the apparatus for managing failure modes for condition based maintenance in marine resource production equipment according to claim 3, the method comprising:
    completing a failure mode database (DB) through failure mode pattern recognition and intellectualization based on normal mode pattern analysis and intellectualization, determination between normal and failure modes and intellectualization, and failure mode pattern decision and intellectualization after construction of an initial database (DB) to approve failure mode and normal mode data;
    collecting marine SCADA data;
    monitoring the collected marine SCADA data;
    performing diagnosis through the failure mode database (DB) based on the monitoring results;
    performing prediction based on the diagnosis results;
    performing decision-making based on the prediction results; and
    maintaining contents regarding the decision-making.

12. A method for managing failure modes for condition based maintenance in marine resource production equipment using the apparatus for managing failure modes for condition based maintenance in marine resource production equipment according to claim 4, the method comprising:
    completing a failure mode database (DB) through failure mode pattern recognition and intellectualization based on normal mode pattern analysis and intellectualization, determination between normal and failure modes and intellectualization, and failure mode pattern decision and intellectualization after construction of an initial database (DB) to approve failure mode and normal mode data;
    collecting marine SCADA data;
    monitoring the collected marine SCADA data;
    performing diagnosis through the failure mode database (DB) based on the monitoring results;
    performing prediction based on the diagnosis results;
    performing decision-making based on the prediction results; and
    maintaining contents regarding the decision-making.

13. A method for managing failure modes for condition based maintenance in marine resource production equipment using the apparatus for managing failure modes for condition based maintenance in marine resource production equipment according to claim 5, the method comprising:
    completing a failure mode database (DB) through failure mode pattern recognition and intellectualization based on normal mode pattern analysis and intellectualization, determination between normal and failure modes and intellectualization, and failure mode pattern decision and intellectualization after construction of an initial database (DB) to approve failure mode and normal mode data;
    collecting marine SCADA data;
    monitoring the collected marine SCADA data;
    performing diagnosis through the failure mode database (DB) based on the monitoring results;
    performing prediction based on the diagnosis results;
    performing decision-making based on the prediction results; and
    maintaining contents regarding the decision-making.

* * * * *